United States Patent
Lathwesen

(10) Patent No.: US 9,186,965 B2
(45) Date of Patent: Nov. 17, 2015

(54) MOTOR VEHICLE LIFTGATE

(71) Applicant: Bayerische Motoren Werke Aktiengesellschaft, Munich (DE)

(72) Inventor: Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/221,872

(22) Filed: Mar. 21, 2014

(65) Prior Publication Data

US 2014/0203591 A1 Jul. 24, 2014

Related U.S. Application Data

(63) Continuation of application No. PCT/EP2012/068860, filed on Sep. 25, 2012.

(30) Foreign Application Priority Data

Sep. 26, 2011 (DE) .......................... 10 2011 083 418

(51) Int. Cl.
*B60J 5/02* (2006.01)
*B60J 5/10* (2006.01)

(52) U.S. Cl.
CPC ...................................... *B60J 5/107* (2013.01)

(58) Field of Classification Search
CPC ................... E05Y 2900/546; E05Y 2201/246; E05Y 2201/434; B60J 5/101; E05F 15/63; E05F 1/1051
USPC ............. 296/146.8, 106, 146.1, 146.4, 146.9, 296/50, 56, 76, 146.11
See application file for complete search history.

(56) References Cited

U.S. PATENT DOCUMENTS

| | | | | |
|---|---|---|---|---|
| 4,307,875 A | * | 12/1981 | Schnitzius et al. | 267/120 |
| 4,413,854 A | * | 11/1983 | Hirshberg | 296/146.8 |
| 5,563,483 A | * | 10/1996 | Kowall et al. | 318/283 |
| 5,876,086 A | * | 3/1999 | Lagrou et al. | 296/146.11 |
| 6,000,747 A | * | 12/1999 | Sehgal et al. | 296/146.8 |
| 6,003,931 A | | 12/1999 | Dancasius et al. | |
| 6,055,775 A | * | 5/2000 | Dering et al. | 49/340 |
| 6,055,776 A | * | 5/2000 | Dettling et al. | 49/341 |
| 6,092,337 A | * | 7/2000 | Johnson et al. | 49/340 |

(Continued)

FOREIGN PATENT DOCUMENTS

| | | |
|---|---|---|
| DE | 196 35 873 A1 | 3/1998 |
| DE | 199 04 098 A1 | 8/2000 |

(Continued)

OTHER PUBLICATIONS

International Search Report (PCT/ISA/210) with English translation dated Nov. 16, 2012 (Seven (7) pages).

(Continued)

*Primary Examiner* — Kiran B Patel
(74) *Attorney, Agent, or Firm* — Crowell & Moring LLP

(57) ABSTRACT

A motor vehicle includes a liftgate or a trunk lid. The opening and/or closing of the liftgate or the trunk lid is assisted or carried out by the operating force of a device. Lateral profiles formed at the liftgate or the trunk lid each have a hollow space, and one device for the lifting and/or lowering of the liftgate or the trunk lid is arranged in each hollow space. Each device is arranged between the roof section of the vehicle body and the liftgate or the trunk lid.

9 Claims, 5 Drawing Sheets

(56) References Cited

U.S. PATENT DOCUMENTS

| | | | |
|---|---|---|---|
| 6,135,536 A * | 10/2000 | Ciavaglia et al. | 296/146.4 |
| 6,137,249 A * | 10/2000 | Butler et al. | 318/266 |
| 6,142,551 A * | 11/2000 | Ciavaglia et al. | 296/56 |
| 6,202,350 B1 * | 3/2001 | Montgomery et al. | 49/139 |
| 6,270,147 B1 * | 8/2001 | Butler et al. | 296/146.4 |
| 6,293,050 B1 * | 9/2001 | Johnk | 49/276 |
| 6,318,025 B1 * | 11/2001 | Sedlak | 49/341 |
| 6,341,809 B1 * | 1/2002 | Chapman | 296/56 |
| 6,478,357 B2 * | 11/2002 | Zhou | 296/56 |
| 6,637,157 B1 * | 10/2003 | Dombrowski et al. | 49/341 |
| RE38,400 E * | 1/2004 | Kowall et al. | 318/283 |
| 6,707,173 B2 * | 3/2004 | Bauman et al. | 310/12.27 |
| 6,755,458 B1 * | 6/2004 | Oberheide | 296/146.8 |
| 6,814,392 B1 * | 11/2004 | Tomaszewski | 296/146.4 |
| 6,898,900 B2 * | 5/2005 | Haag et al. | 49/342 |
| 7,034,485 B2 * | 4/2006 | Kuan et al. | 318/466 |
| 7,503,619 B2 * | 3/2009 | Werner | 296/146.8 |
| 7,614,616 B2 * | 11/2009 | Bauman et al. | 267/120 |
| 7,648,189 B2 * | 1/2010 | Porat et al. | 296/146.4 |
| 7,959,204 B2 * | 6/2011 | Yoshida | 296/56 |
| 2001/0047625 A1 * | 12/2001 | Sedlak et al. | 49/341 |
| 2002/0074959 A1 * | 6/2002 | Van Wiemeersch | 318/445 |
| 2002/0174604 A1 * | 11/2002 | Lauderbach et al. | 49/324 |
| 2002/0180233 A1 * | 12/2002 | Benthaus et al. | 296/76 |
| 2003/0015884 A1 * | 1/2003 | Paiva et al. | 296/56 |
| 2003/0030299 A1 * | 2/2003 | Cleland et al. | 296/146.8 |
| 2003/0089041 A1 * | 5/2003 | Daniels et al. | 49/341 |
| 2004/0124662 A1 * | 7/2004 | Cleland et al. | 296/146.4 |
| 2004/0205934 A1 * | 10/2004 | Derbis et al. | 16/289 |
| 2005/0155289 A1 * | 7/2005 | Oberheide | 49/340 |
| 2005/0168010 A1 * | 8/2005 | Cleland et al. | 296/146.8 |
| 2006/0181108 A1 * | 8/2006 | Cleland et al. | 296/146.4 |
| 2007/0063535 A1 * | 3/2007 | Kargilis et al. | 296/146.4 |
| 2007/0262609 A1 * | 11/2007 | King et al. | 296/146.8 |
| 2008/0250720 A1 * | 10/2008 | Oxley et al. | 49/358 |
| 2008/0276537 A1 * | 11/2008 | Hanna et al. | 49/343 |
| 2011/0314739 A1 * | 12/2011 | Kaburaki | 49/70 |

FOREIGN PATENT DOCUMENTS

| | | |
|---|---|---|
| DE | 199 33 765 A1 | 1/2001 |
| DE | 698 22 169 T2 | 10/2004 |
| DE | 10 2004 021 443 A1 | 11/2005 |
| DE | 10 2004 063 231 A1 | 12/2005 |
| DE | 10 2007 039 808 A1 | 2/2009 |
| DE | 10 2007 052 620 A1 | 5/2009 |
| EP | 1 011 995 B1 | 3/2004 |
| EP | 1 457 373 A1 | 9/2004 |

OTHER PUBLICATIONS

German Search Report with English translation dated Jul. 30, 2012 (Ten (10) pages).

* cited by examiner

MOTOR VEHICLE LIFTGATE

CROSS REFERENCE TO RELATED APPLICATIONS

This application is a continuation of PCT International Application No. PCT/EP2012/068860, filed Sep. 25, 2012, which claims priority under 35 U.S.C. §119 from German Patent Application No. 10 2011 083 418.4, filed Sep. 26, 2011, the entire disclosures of which are herein expressly incorporated by reference.

BACKGROUND AND SUMMARY OF THE INVENTION

The invention relates to a motor vehicle including a vehicle body, a vehicle body opening constructed in the vehicle body, and a liftgate or a trunk lid arranged on the vehicle body opening.

From German Patent Document DE 10 2007 039 808 A1, a motor vehicle is known which has a swivelable liftgate. As a result of the type of construction known from German Patent Document DE 10 2007 039 808 A1, it is possible to increase the loading width of the liftgate opening at least in the area of the rear window pane.

From European Patent Application EP 1 011 995 B1 (German Patent Application DE 698 22 169 T2), a liftgate for a motor vehicle is known, where one gas pressure spring respectively is provided in the lateral struts parallel to a rear window pane, for lifting the rear window pane.

It is an object of the invention to create a motor vehicle which has a liftgate or a trunk lid, the opening and/or closing of the liftgate or the trunk lid being assisted or carried out by the operating force of a device.

A motor vehicle according to embodiments of the invention has a vehicle body, a vehicle body opening constructed in the vehicle body, and a liftgate or a trunk lid arranged on the vehicle body opening. The liftgate or the trunk lid is swivelably arranged on a roof section of the vehicle body. The liftgate or the trunk lid has a body section and a rear window pane. Furthermore, at least one seal is provided, which is arranged on the vehicle body opening for sealing off the liftgate or the trunk lid. Lateral profiles, which are spaced laterally with respect to one another, are constructed on the liftgate or the trunk lid.

Advantageously, the lateral profiles are each provided with a hollow space in which one device respectively is arranged, which is used for lifting and/or lowering the liftgate or the trunk lid, the respective device being arranged between the roof section of the vehicle body and the liftgate or the trunk lid.

In an advantageous embodiment, the device for lifting and/or lowering the liftgate or the trunk lid is a component that can release a stored spring force, in which case the released spring force is manually returned after the intended supporting action. In another advantageous embodiment, the device is connected to an energy source, so that the energy is supplied directly when the device is used.

Advantageously, the device is a pneumatic spring, particularly a gas pressure spring, which, in addition to providing a spring force, also causes a damping.

Advantageously, the device is driven by an electric motor.

In an advantageous embodiment, the device driven by an electric motor has motion screws or cable controls as driving devices. The cable controls may also be equipped with deflection devices.

In an advantageous embodiment, one end of the respective device is arranged on a bearing which is constructed at the respective lateral profile of the liftgate or the trunk lid. A respective opposite end of the device is linked to a bearing, which is arranged on a component of the vehicle body.

A free end of a hinge is advantageously fastened to the respective lateral profile of the liftgate or the trunk lid. For this purpose, a respective opposite free end of the hinge is arranged at a bearing which is constructed on a component of the vehicle body.

In an advantageous embodiment, the hollow space of the respective lateral profile is dimensioned to be so large that the respective device can be moved with play between two limit positions, the limit positions being created by the closed condition of the liftgate or the trunk lid and by the opened condition of the liftgate or the trunk lid.

The size of the liftgate opening is advantageously increased as a result of the elimination of a rain groove or by the reduction of the width of a rain groove at a profile section, which is constructed on the vehicle body components of the liftgate opening, and to which a sealing profile is fastened.

Other objects, advantages and novel features of the present invention will become apparent from the following detailed description of one or more preferred embodiments when considered in conjunction with the accompanying drawings.

DETAILED DESCRIPTION OF THE EXEMPLARY EMBODIMENTS

Figure 1:
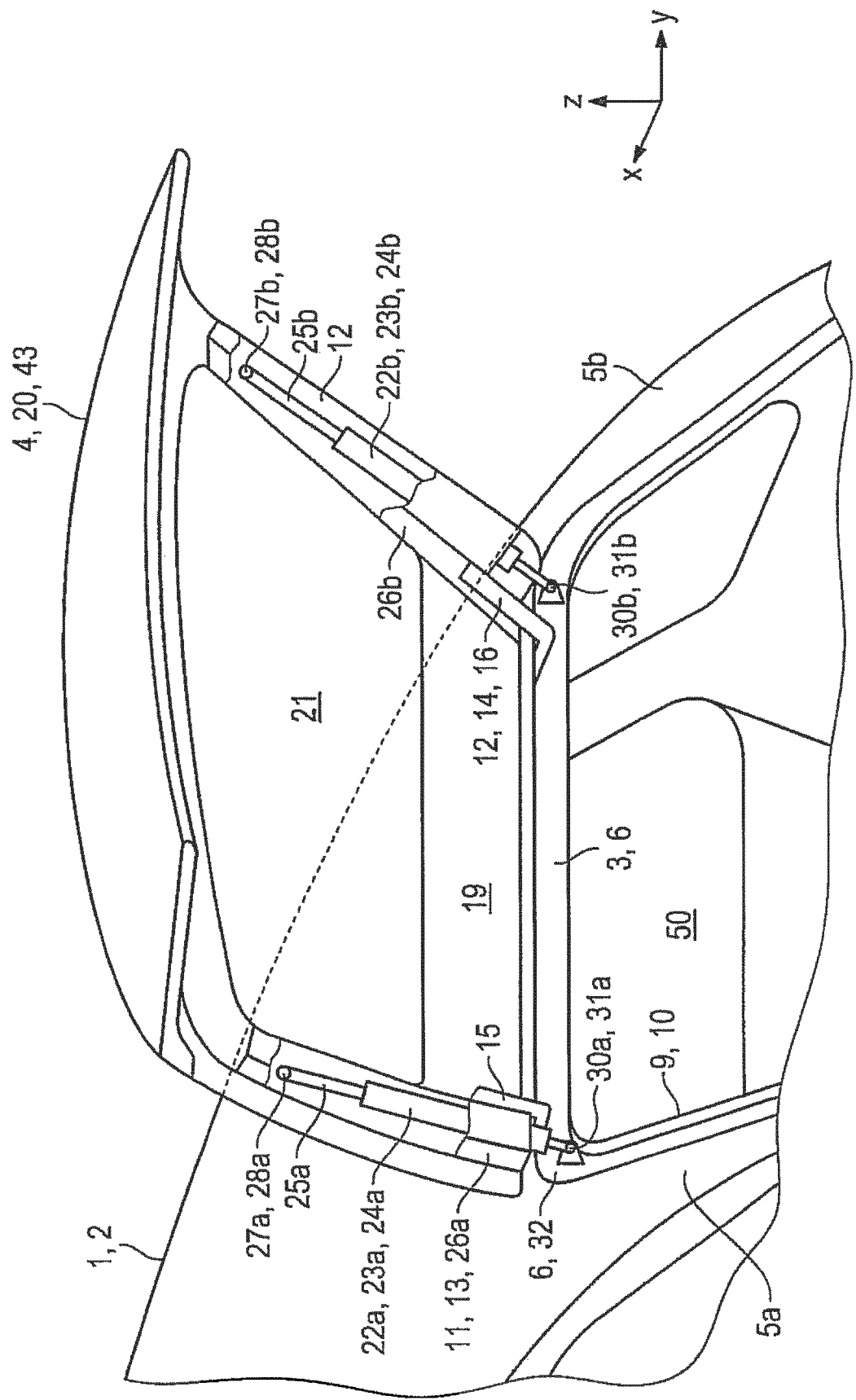
FIG. 1 is a perspective view of a partially illustrated rear area of a motor vehicle, wherein the liftgate is in an opened condition.

FIG. 1 illustrates a motor vehicle 1, wherein a liftgate opening 3 is constructed in a vehicle body 2, and a liftgate 4 is arranged on the tailgate opening 3. In FIG. 1, the liftgate 4 is in an opened condition 43. The liftgate opening 3 is bordered by two opposite vehicle body pillars 5a and 5b, a roof section 6, and a trunk floor section (not shown).

Figure 2:
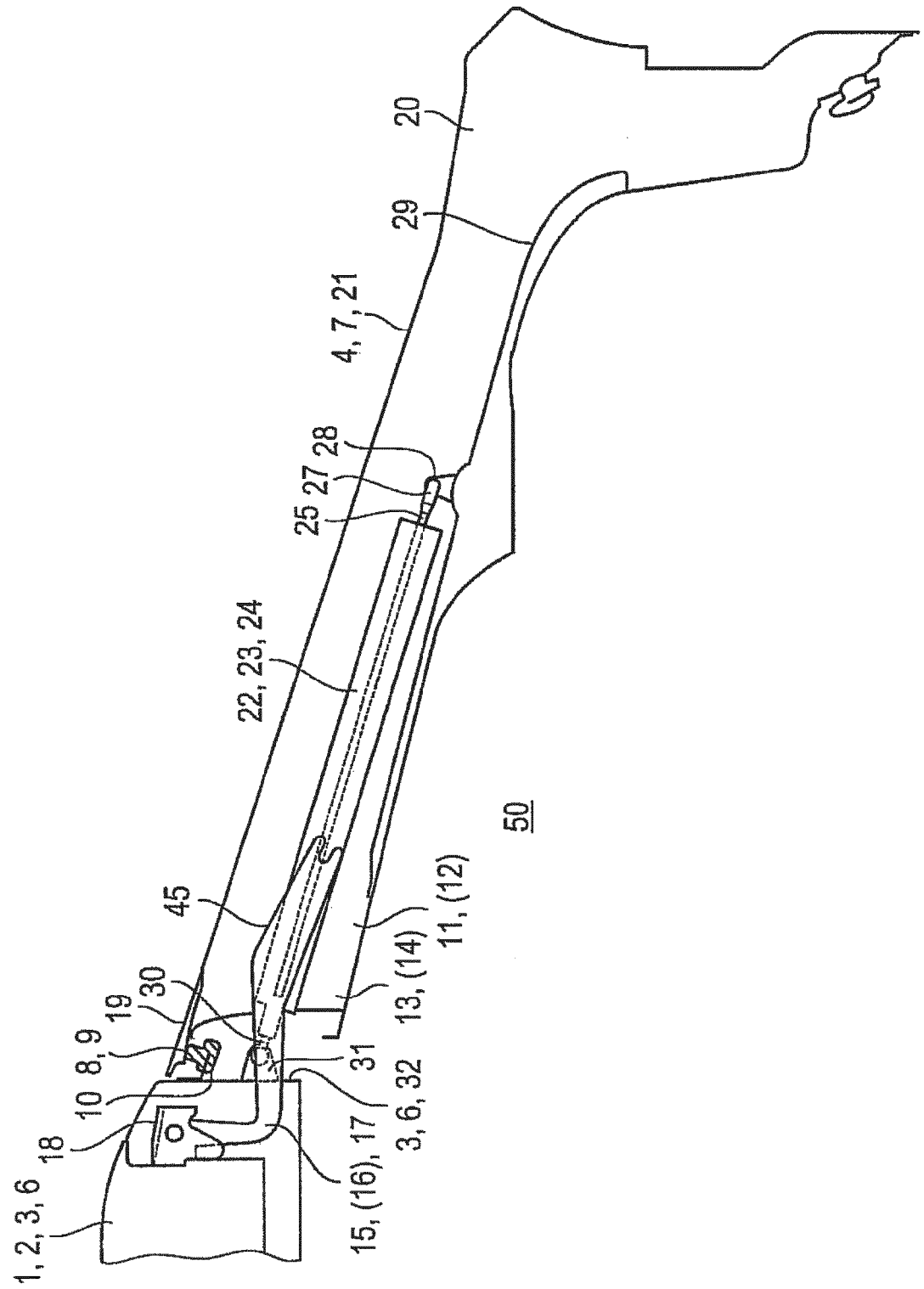
FIG. 2 is a sectional view of the liftgate illustrated in FIG. 1 in a closed condition of the liftgate, the section extending through a lateral strut of the liftgate, so that the arrangement of a gas pressure spring can be recognized in a hollow space of the strut.

In a closed condition 7 of the liftgate 4 illustrated in FIG. 2, a surrounding edge 8 of the liftgate 4 rests on a surrounding sealing profile 9, which is arranged on a surrounding edge 10 of the liftgate opening 3.

The liftgate 4 has two lateral struts or profiles 11, 12, to whose ends 13, 14 one hinge 15, 16 respectively is fastened. A respective vehicle-body-side end 17 of the respective hinge 15, 16 illustrated in FIG. 2 is swivelably arranged by way of a bearing 18 in a known manner at the roof section 6.

In the illustrated embodiment, an upper transverse section 19 of the liftgate 4 extending in the transverse direction y of the vehicle extends between the two lateral profiles 11, 12. A rear window pane 21 is arranged between the lateral profiles 11, 12, the upper transverse section 19, and a lower liftgate body 20.

In the illustrated embodiment, the respective lateral profile 11, 12 is only partially shown, so that one device 22a, 22b respectively for lifting and/or lowering the liftgate 4 is visible. In the embodiment illustrated in FIGS. 1 and 2, the device 22, is, for example, a gas pressure spring 23.

In another embodiment, the device 22 is operated electrically (not shown). The electrically operated device 22 has, for example, an electric motor and a driving device connected therewith. The driving devices may, for example, be motion screws, such as a spindle drive, or cable controls or Bowden cables, optionally with deflection devices and/or pulley blocks.

The device 22a, 22b illustrated in FIGS. 1 and 2 as a gas pressure spring 23a, 23b has a cylinder 24a, 24b as well as a piston 25a, 25b. In the illustrated embodiment, the respective lateral profile 11, 12 is surrounded by a covering 26a, 26b. As shown in FIGS. 1 and 2, a free end 27a, 27b of the piston 25a, 25b is arranged at a bearing 28 that is arranged on an interior surface 29 of the respective lateral profile 11, 12. A free end 30a, 30b of the respective cylinder 24a, 24b is arranged at a bearing 31a, 31b that is arranged at the vehicle body 2 on a transverse section 32 of the roof section 6.

Figure 3:
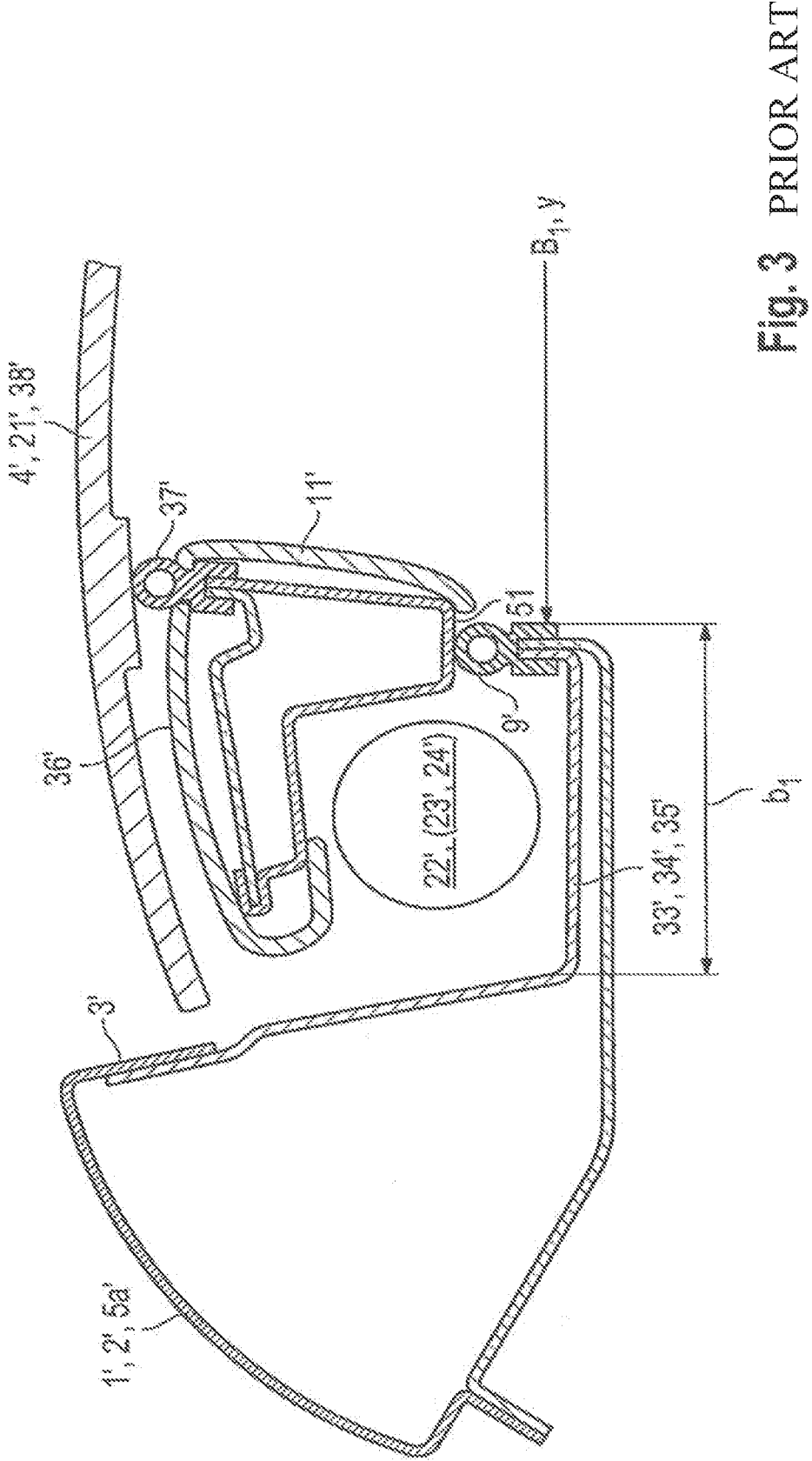
FIG. 3 is a cross-sectional view of an edge area of a known liftgate, which has a swivelable rear window pane, wherein a rain groove is formed on a frame section of the vehicle body, and a gas pressure spring is arranged between the rain groove and a lateral strut of the liftgate or the trunk lid.

FIG. 3 is a cross-sectional view of an edge area of a known liftgate 4'. At the edge area of the known liftgate 4', a vehicle body pillar 5a' is constructed which has a U-shaped profile section 33'. On the one hand, the U-shaped profile section 33' is used as a rain groove and, on the other hand, it is used for fastening a surrounding sealing profile 9'. Between an L-shaped lateral profile 11' and the U-shaped profile section 33' of the vehicle body pillar 5a', a device 22' is arranged which may, for example, be a gas pressure spring 23'.

FIG. 3 shows the cylinder 24' of the gas pressure spring 23'. A width $b_1$ of a horizontal section 35' of the U-shaped profile section 33' reduces a loading width $B_1$ in the transverse direction y of the vehicle. A seal 37' is provided on an outer surface 36' of the lateral profile 11' pointing toward the outside. An underside of the rear window pane 21' rests on the seal 37', which rear window pane 21' can be swiveled from a closed position 38' illustrated in FIG. 3 into a opened position which is not shown.

Figure 4:
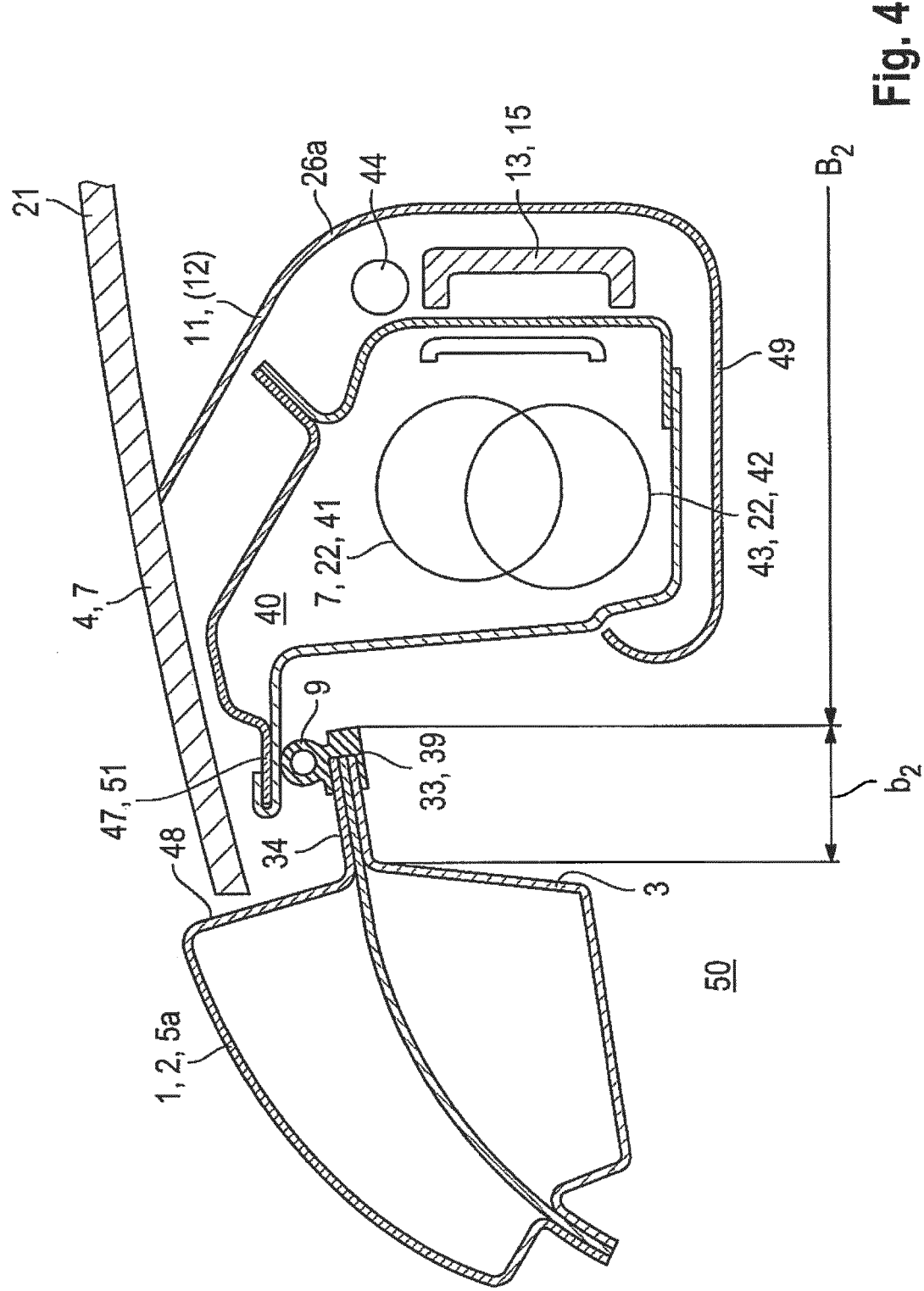
FIG. 4 is a sectional view of an edge area of the liftgate or the trunk lid according to embodiments of the invention, a device for lifting or lowering the liftgate or the trunk lid being arranged in a hollow space of a lateral profile or strut of the liftgate or the trunk lid.

FIG. 4 is a cross-sectional view of an edge area of the liftgate 4 or the trunk lid 4 according to embodiments of the invention. The device 22 for lifting or lowering the liftgate 4 or the trunk lid 4 is arranged in a hollow space 40 of the lateral profile or the strut 11 (12) of the liftgate 4 or the trunk lid 4.

In the case of the type of construction according to embodiments of the invention, a profile section 33 of the vehicle body pillar 5a is provided, which profile section 33 projects into the liftgate opening 3. The sealing profile 9 is fastened to one end 39 of the profile section 33. A profile section 47 with a sealing surface 51 is provided at the respective lateral profile 11, 12. The profile section 47 points in the direction of an outer surface 48 of the liftgate opening 3 surrounding the liftgate 4. The sealing surface 51 of the profile section 47 is constructed opposite the sealing profile 9. In the closed condition of the liftgate 4, the sealing surface 51 of the respective lateral profile 11, 12 rests against the sealing profile 9.

As a result of the elimination or reduction of the rain groove 34 with respect to the outer surface 49 of the respective lateral profile 11, 12 pointing into the vehicle interior 50, the available surface of the liftgate opening 3 is enlarged.

As a result of the elimination or reduction in size of the rain groove 34, the profile section 33 has a narrower construction in comparison to the U-shaped profile section 33' of FIG. 3 and correspondingly has a width $b_2$ which is smaller than the width $b_1$ of the U-shaped profile section 33'. This results in a larger loading width $B_2$ in the transverse direction y of the vehicle and, as also indicated in FIG. 5 by the dimensions $z_3'$ and $z_3$, in a greater loading height in the direction of the vehicle height z.

FIG. 4 further shows the two limit positions 41, 42 of the device 22 in the closed condition 7 and in the opened condition 43. The respective lateral profile 11, 12 is surrounded by a covering 26a, 26b. One hinge 15, 16 respectively is arranged parallel to the lower end 13, 14 of the respective lateral profile 11, 12. A cable harness 44 is displayed above the hinge 15.

In contrast to the swivelable liftgate 4' illustrated in FIG. 3, in the liftgate 4 illustrated in FIG. 4, the rear window pane 21 is fixedly arranged on the liftgate 4. In an embodiment, the rear window pane 21 of the liftgate 4 can also be designed to be swivelable.

Figure 5:
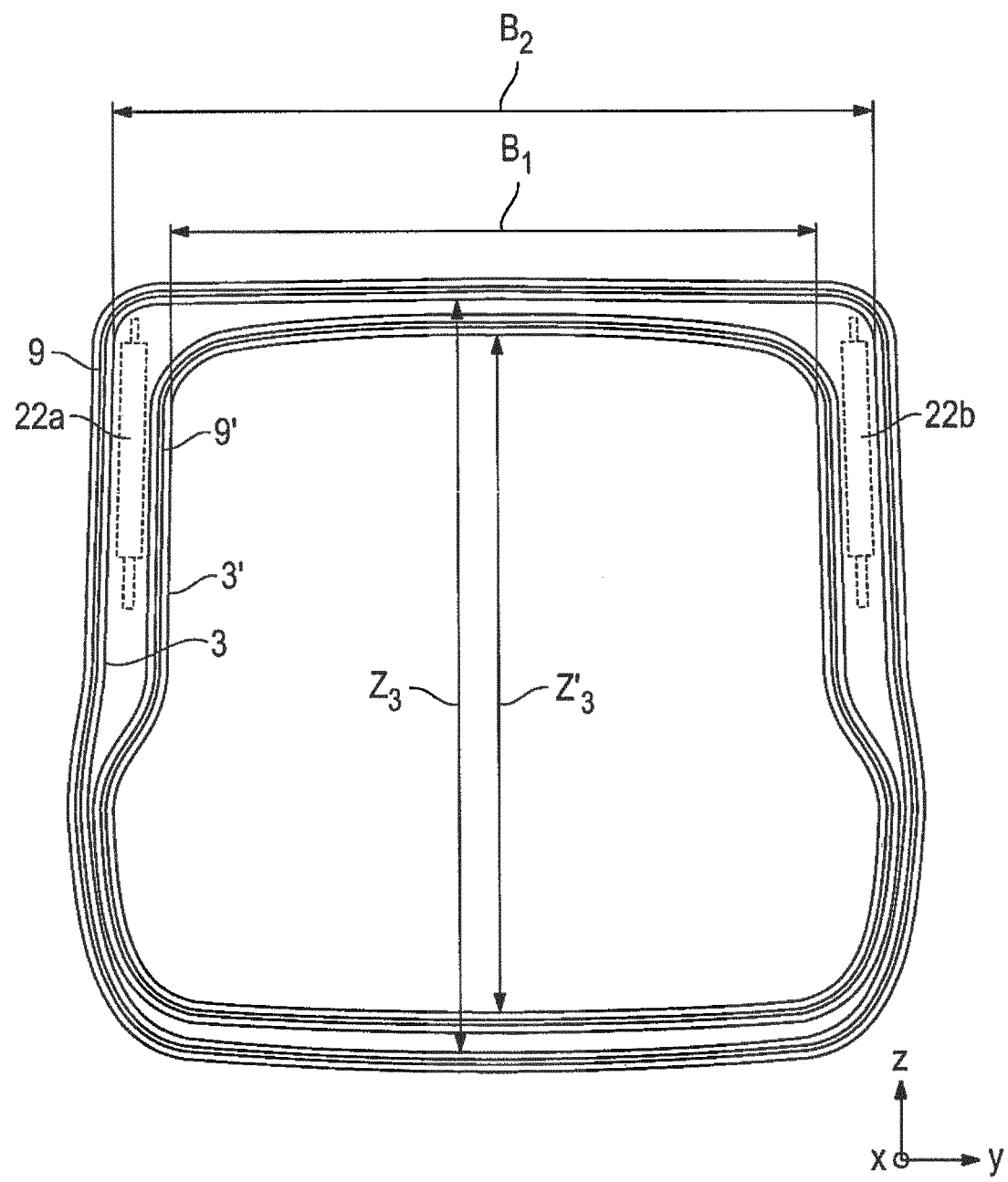
FIG. 5 is a top view of a liftgate opening corresponding to the known type of construction illustrated in FIG. 3 and of a liftgate opening corresponding to the type of construction according to the embodiments of invention illustrated in FIG. 4, an enlargement of the loading width being achieved, as a result of the elimination of mutually spaced opposite rain grooves or by the reduction of the width of mutually spaced opposite rain grooves at least in an upper area of the liftgate opening.

FIG. 5 shows the enlargement of the loading width from the narrower loading width $B_1$ with the arrangement of one (activating) device 22'a, 22'b respectively above a profile section 33' in comparison to the loading width $B_2$ in the case of the arrangement of the respective activating device 22a, 22b in a hollow space 40, 40b of the respective lateral profile 11, 12 of the liftgate 4. As indicated by the dimensions $z_3'$ and $z_3$ of FIG. 5, in the illustrated embodiment, the loading height $z_3$ in the direction of the vehicle height z is also greater.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
    a vehicle body;
    a vehicle body opening constructed in the vehicle body;
    a liftgate or a trunk lid arranged on the vehicle body opening, wherein the liftgate or the trunk lid is swivelably arranged on a roof section of the vehicle body, and the liftgate or the trunk lid has a body section and a rear window pane, with at least one seal, which is arranged on the vehicle body opening for sealing off the liftgate or the trunk lid;
    laterally mutually spaced profiles formed at laterally outer regions of the liftgate or the trunk lid, wherein each of the lateral profiles has a hollow space extending along their respective laterally outer regions at least partially along lateral outer sides of the rear window pane; and
    a device arranged in each of the hollow spaces arranged to provide energy to assist lifting the liftgate or the trunk lid, wherein each device is arranged between a lateral portion of the roof section of the vehicle body and the corresponding laterally outer region of the liftgate or the trunk lid.

2. The motor vehicle according to claim 1, wherein:
each device is a component that is configured to release a stored spring force, and the released spring force is returned manually after a provided supporting action, or
each device is connected to an energy source so that the energy is supplied directly when the device is used.

3. The motor vehicle according to claim 1,
wherein each device is a pneumatic spring which, in addition to providing a spring force, also causes a damping.

4. The motor vehicle according to claim 3,
wherein each device is a gas pressure spring.

5. The motor vehicle according to claim 2,
wherein each device is driven by an electric motor.

6. The motor vehicle according to claim 5,
wherein each device has motion screws or cable controls as driving devices.

7. The motor vehicle according to claim 1,
wherein an end of each device is arranged on a first bearing which is arranged on the respective lateral profile of the liftgate or the trunk lid, and an opposite end of each device is linked to a second bearing which is constructed on a component of the vehicle body.

8. The motor vehicle according to claim 1,
wherein a free end of a hinge is fastened to one of the lateral profiles, and an opposite free end of the hinge is arranged on a bearing which is constructed on a component of the vehicle body.

9. The motor vehicle according to claim 1,
wherein each hollow space is dimensioned to be large enough that the respective device is movable with play between limit positions, the limit positions resulting from a closed condition of the liftgate or the trunk lid and from an opened condition of the liftgate or the trunk lid.

* * * * *